United States Patent [19]

Schaupp, Jr. et al.

[11] Patent Number: 5,594,778
[45] Date of Patent: Jan. 14, 1997

[54] RADIO TELEPHONE OPERATING TECHNIQUE

[75] Inventors: George W. Schaupp, Jr., Schaumburg; Laura A. Sheley, Prospect Heights; Kirk W. Dailey, Palatine, all of Ill.

[73] Assignee: Motorola, Inc., Schaumburg, Ill.

[21] Appl. No.: 544,742

[22] Filed: Oct. 18, 1995

Related U.S. Application Data

[60] Continuation of Ser. No. 228,173, Apr. 15, 1994, abandoned, which is a division of Ser. No. 650,346, Feb. 4, 1991, abandoned.

[51] Int. Cl.$^6$ .................................................. H04M 11/00
[52] U.S. Cl. ............................. 379/58; 379/59; 379/368
[58] Field of Search ................................ 379/58, 59, 368

[56] References Cited

U.S. PATENT DOCUMENTS

| | | |
|---|---|---|
| 4,425,627 | 1/1984 | Eibner et al. .......................... 346/900 |
| 4,736,410 | 4/1988 | Nishida et al. . |
| 4,769,516 | 9/1988 | Allen . |
| 4,872,196 | 10/1989 | Royer et al. . |
| 4,979,207 | 12/1990 | Baum et al. . |
| 5,007,077 | 4/1991 | Fields et al. ............................ 379/88 |

FOREIGN PATENT DOCUMENTS 0023266  1/1987  Japan ..................................... 379/59

OTHER PUBLICATIONS

Motorola, Micro TAC 9800XL, Cellular Portable Telephone, User's Manual, 1989. This manual describes the operation of a cellular portable telephone which is currently available.

NovAtel 3200/3300 Series, Jan. 1990.

*Primary Examiner*—Curtis Kuntz
*Assistant Examiner*—G. J. Oehling
*Attorney, Agent, or Firm*—Kirk W. Dailey; John G. Rauch

[57] ABSTRACT

A radiotelephone (101) has a memory, a display (127) and a keypad (117) with at least one key (121) to produce at least a first function key signal and a second function key signal, and a plurality of data keys (119). First, a first function key creates a first function key signal, turning on the radiotelephone (209); second, a phone number is selected (215). Third, the first function key creates a second function key signal from said first function key, activating the radiotelephone to call the phone number (207). Fourth, a second function key creates a third function key signal disconnecting the radiotelephone from said call (211). Fifth, the second function key creates a fourth function key signal turning off the radiotelephone (213).

26 Claims, 6 Drawing Sheets

5,594,778

RADIO TELEPHONE OPERATING TECHNIQUE

This is a continuation of application Ser. No. 08/228,173, filed Apr. 15, 1994 now abandoned which is a continuation of application Ser. No. 07/650,346, filed Feb. 4, 1991 and now abandoned.

FIELD OF THE INVENTION

This invention is generally related to radiotelephones and more specifically to methods of operating a radiotelephone.

BACKGROUND OF THE INVENTION

There is essentially one known technique of using a keypad for controlling a radiotelephone. The technique uses from four to twelve function keys in addition to the standard twelve key data pad and it includes a display for the data input.

The function keys generally include some or all of the following functions: send, end, power, recall, store, clear, function, name, volume and menu. The number and type of keys depends on the manufacturer and the features on the phone.

The function keys which are essential to the operation of the phone are the send, end, power and clear keys. The send key is used to initiate a phone call to the number entered with the data keys and located in the display. The end key is used to end a phone call. The power key is used to turn the radiotelephone on and off with successive key activations. The clear button is used when entering data to clear either one character of data or the entire display of data, depending on how the key is used.

There are three keys which can be used to store and recall names and phone numbers from the radiotelephone memory, namely, the store key, the recall key, and the name key. The store key is used to store data into a memory location. First, the data is entered into the radiotelephone with the data keys, then the store key is pressed, followed by a memory location entered with the data keys. This data can be either symbols, representing names or numbers representing phone numbers. The recall key followed by an appropriate memory location will recall the phone number or name contained within that memory location. The name key is used to activate a menu of names which have phone numbers corresponding to them. The user can scroll through the menu of names using the "#" and the "*" keys.

There are other keys which activate features of the phone which vary between manufacturers. The function key is used to activate other features of the phone denoted by the number input with the data keys which follow activation of the function key. Finally, the menu key is used to access a menu of advanced features which can be scrolled through using the "#" and the "*" keys.

With thorough knowledge of the operation of these keys, a complicated radiotelephone can be successfully operated. However, a high percentage of people do not access the advanced features of the phone because of lack of understanding of the complexities involved in such use. Therefore, there exists a need for an improved technique for operating a radiotelephone; one in which the operation of the radiotelephone is intuitive to the uneducated user.

SUMMARY OF THE INVENTION

The present invention encompasses a method of operating a radiotelephone. The radiotelephone has a memory, a display and a keypad with at least one key to produce at least a first function key signal and a second function key signal, and a plurality of data keys.

The method comprises creating a first function key signal from a first function key to turn on the radiotelephone; selecting a phone number; creating a second function key signal from said first function key, activating the radiotelephone to call said phone number; creating a third function key signal from a second function key disconnecting the radiotelephone from said call; and creating a fourth function key signal from said second function key, turning off the radiotelephone.

DESCRIPTION OF A PREFERRED EMBODIMENT

Figures 1, 2:
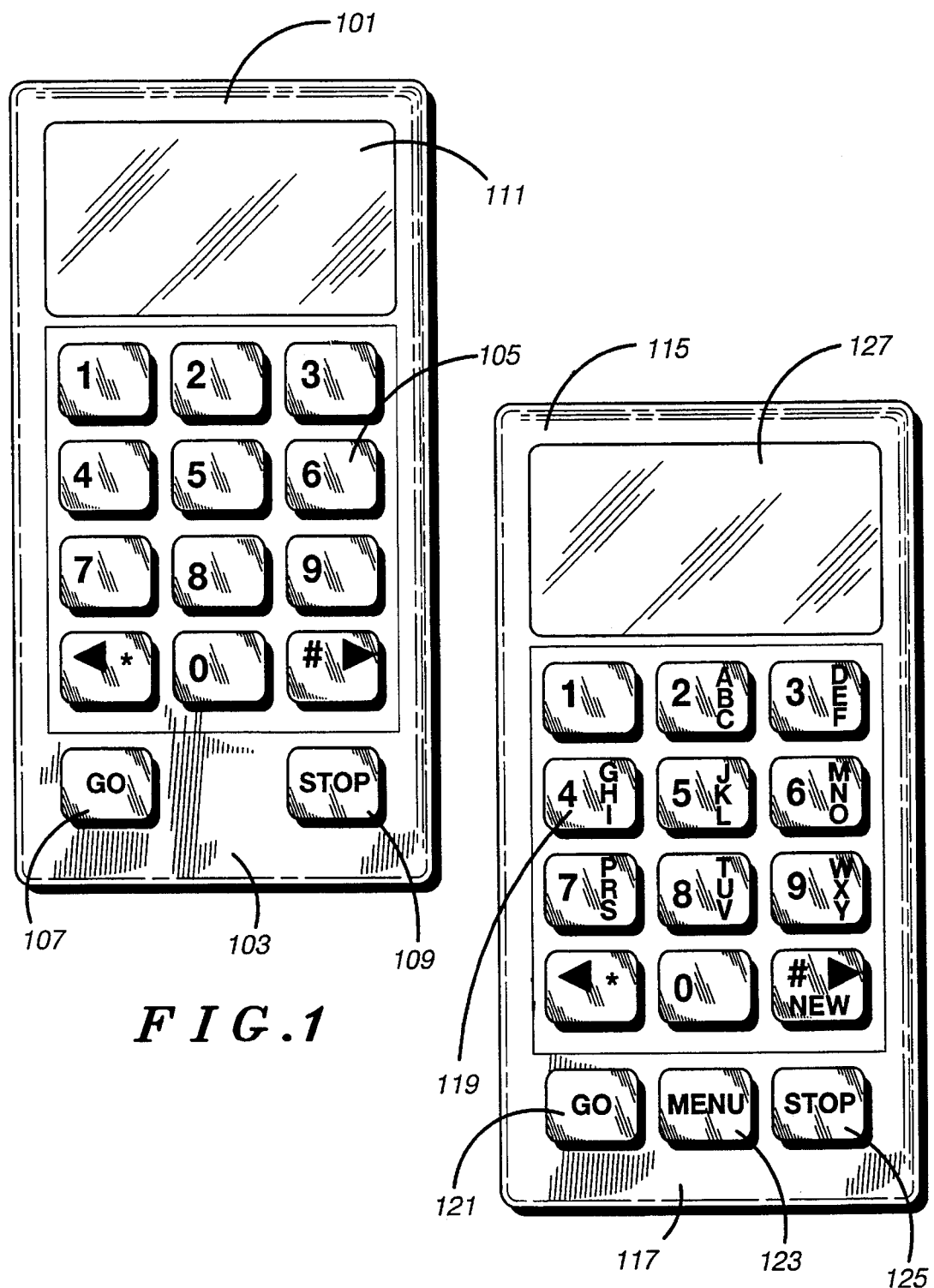
FIG. 1 is a drawing of an embodiment which may include the present invention.
FIG. 2 is drawing of an alternate embodiment which may include the present invention.

FIG. 1 reveals a first embodiment of the disclosed invention. The radiotelephone 101 contains a display 111, a keypad 103 which has a standard 12 data keys 105, plus two additional function keys 107 and 109. The standard 12 data keys contain the numbers from 0 to 9, the "#" key and the "*" key. The two additional function keys are the go key 107 and the stop key 109.

FIG. 2 reveals a second embodiment of the disclosed invention it is a radiotelephone 115 having a display 127, a keypad 117 containing a standard 12 data key inputs 119 containing symbols on the keys as follows: Data key 2 containing number 2 and alpha characters A, B, and C, data key 3 containing D, E and F, data key 4 containing G, H and I, data key 5 containing J, K and L, data key 6 containing M, N and O, data key 7 containing P, R and S, data key 8 containing T, U and V, and data key 9 containing W, X and Y. The "*" and "#" keys contain directional arrows. Although in this embodiment alpha characters are used, other symbols may substituted such as kata-kana, as described in U.S. Pat. No. 4,872,196, issued on Oct. 3, 1989 on behalf of Paul Royer et al., with the same assignee as the present invention, titled "Telephone Keypad Input Device". The keypad 117 also contains three function buttons, 121, 123, 125. These are the go key 121, the menu key 123 and the stop key 125. The operation of these three function keys in the operation of the radiotelephone 101 follows.

Figure 3:
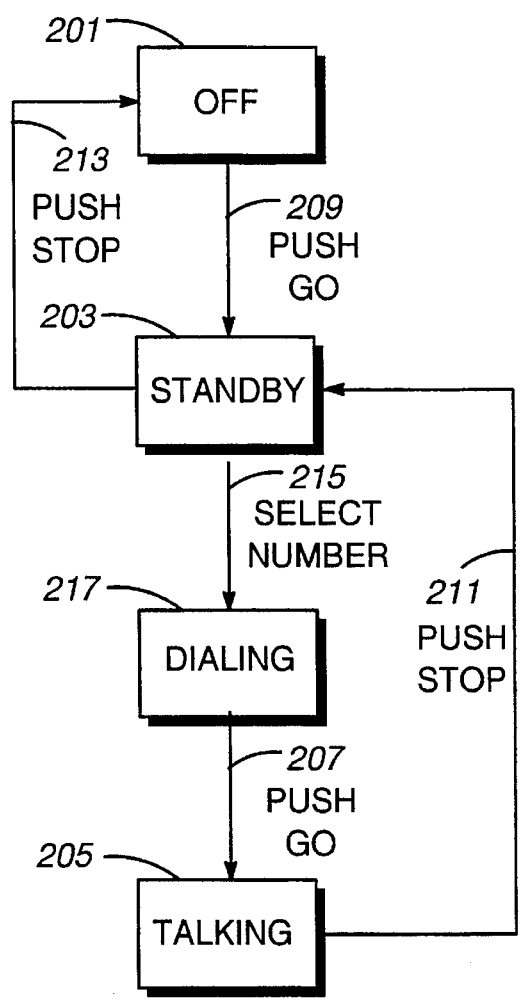
FIG. 3 is a state diagram of a basic phone call in accordance with the present invention.

FIG. 3 is a state diagram of a basic phone call in accordance with the present invention. The four states are the off state 201, the standby state 203, the dialing state 217 and the talking state 205. In general, to transfer states the user must press a data key 119, the stop key 125 or the go key 121. Specifically, to transfer from the off state 201 to the standby state 203 the user must select the go key 209. Moving from the standby state 203 to the off state 201 the user must select the stop key 213. In order to move from the standby state to the dialing state 217, the user must select a number 215. Moving from the dialing state 217 to the talking state 205 requires pushing the go key 207. To transfer from the talking state 205 to the standby state 203, the user must push the stop key 211.

Figure 4:
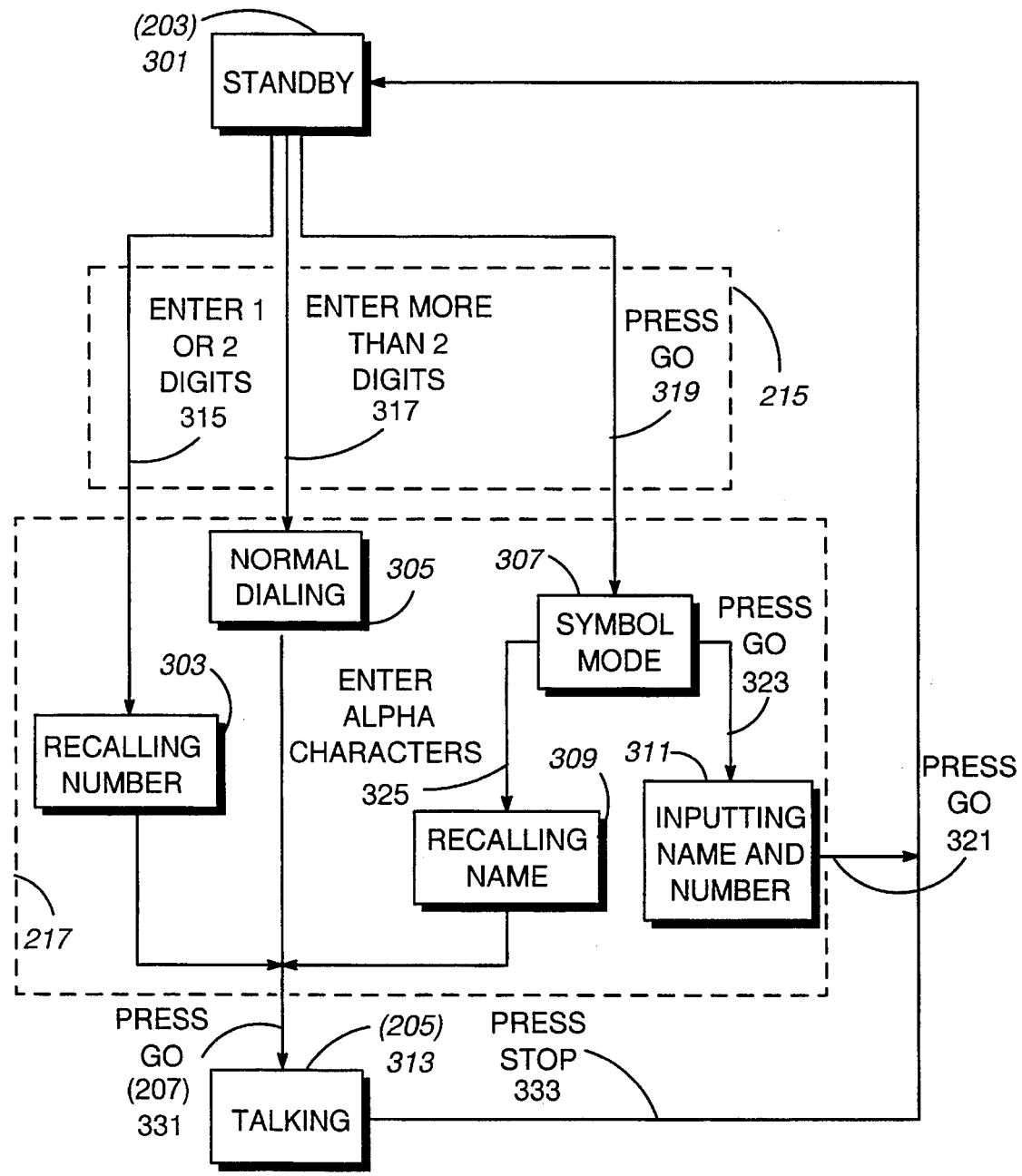
FIG. 4 is a state diagram of selecting a phone number in accordance with the present invention.

FIG. 4 is an exploded view of selecting a number 215 and the dialing state 217 from FIG. 3. There are three states within the dialing state 217: normal dialing state 305, recalling a number state 303, and recalling a name state 309. In order to transition between standby state 301 and the normal dialing state 305 the user must select a sequence of data keys which represent a phone number 317, for this embodiment the sequence must be larger than two data keys. In order to transition between standby state 301 and the recalling number state 303 the user must select a sequence of data keys which represent a memory 907 location within the memory of the radiotelephone 101, for this embodiment it is one or two data keys. In order to transition between the recalling name state 309 and the standby state, the user must first transfer to the symbol mode state 307 by pressing the go key 319. The transfer from the symbol mode state 307 to the recalling name state 309 requires the user to enter a data key 119 which represents the symbol closest to the name in which the user is trying to recall at 325. Once the user has reached one of the dialing states 303, 305,309 pressing the go key 331 will place the radiotelephone 101 into the talking state 313. Once in the talking state 313, one may press the stop key 333 which will end the call and return the caller to the standby state 301. While in the symbol mode state 307, the user has the option of inputting a new name and phone number instead of recalling a name and phone number. This can be accomplished by pressing the go key 323, thereby, transferring from the symbol mode state 307 to the inputting name and number state 311. While in the inputting name and number state 311, pressing the go key 321 will return the user to the standby state 301.

Figure 6:
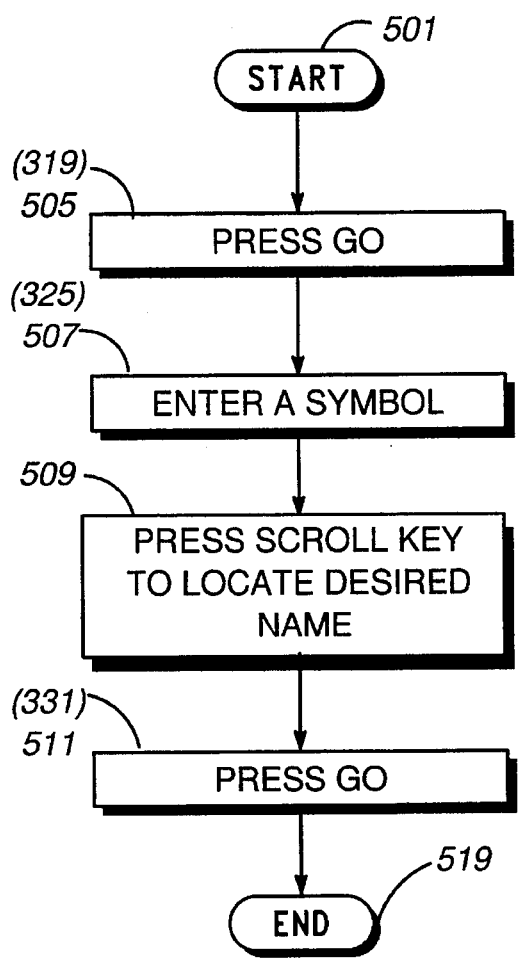
FIG. 6 is a process flowchart of recalling a name from the memory of a radiotelephone in accordance with the present invention.
Figure 5:
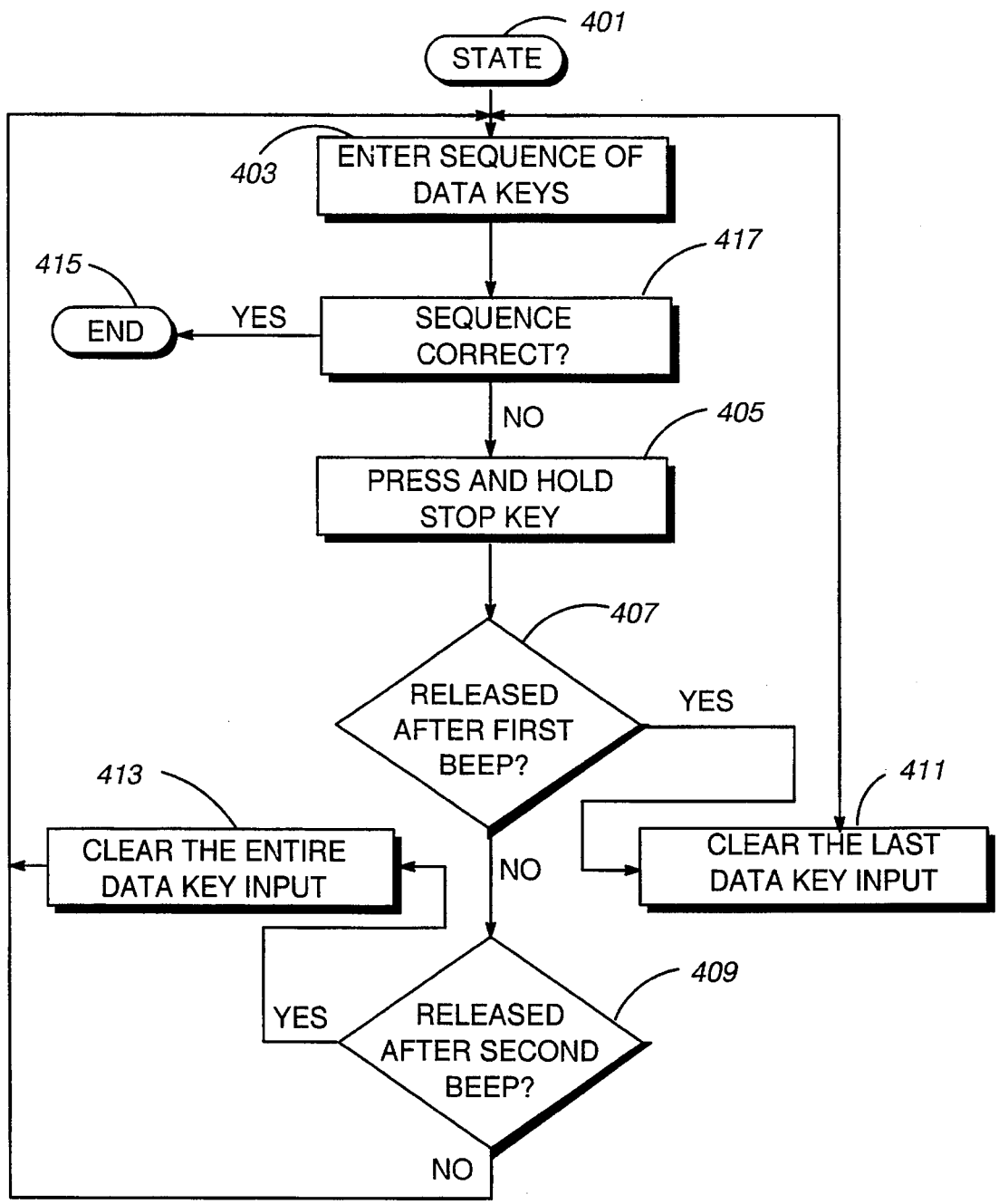
FIG. 5 is a process flowchart of clearing data input from the display of a radiotelephone in accordance with the present invention.

At any point in time when entering a sequence of data keys it may be necessary to clear one of the inputs or the entire data input depending upon how severe the mistake. FIG. 5 reveals the process for clearing data from the display 111. First, the process starts at 401, at 403 the user enters the sequence of the data keys 105, the user then will visually check the display 111 to see if the data is correct at 417. At 405, if it is not correct the user must press and hold the stop key 109. If the user wants to clear the last data key input at 411, then the stop key 109 must be released after the first beep at 407. If the entire data key input is to be cleared at 413, the stop key 109 must be released after the second beep at 409. This process is repeated until the data displayed is correct, then process is stopped at 415. FIG. 6 is the process flowchart for recalling a name from memory 907 which is part of the dialing state 217. The process is started at 501. At 505, the user presses the go key 121, this is also shown in FIG. 4 as transition action 319. Secondly, the user must enter a data key 119 which represents the symbol closest to the name in which the user is trying to recall at 507. This puts the user into close proximity to the name in which he wants to recall. For example, on a standard key input, if the user was to recall Bill, he would press data key 2 because it contains the letters A, B and C. Next, the user would use the scroll keys located on the "*" and "#" keys to scroll either in ascending alphabetical order or descending alphabetical order at 509 until the name is located. After the correct name is displayed on the radiotelephone 101, the go key 121 is pressed at 511, this completes the process of recalling a name from memory 907 and is the transition state 331 noted in FIG. 4.

Figure 7:
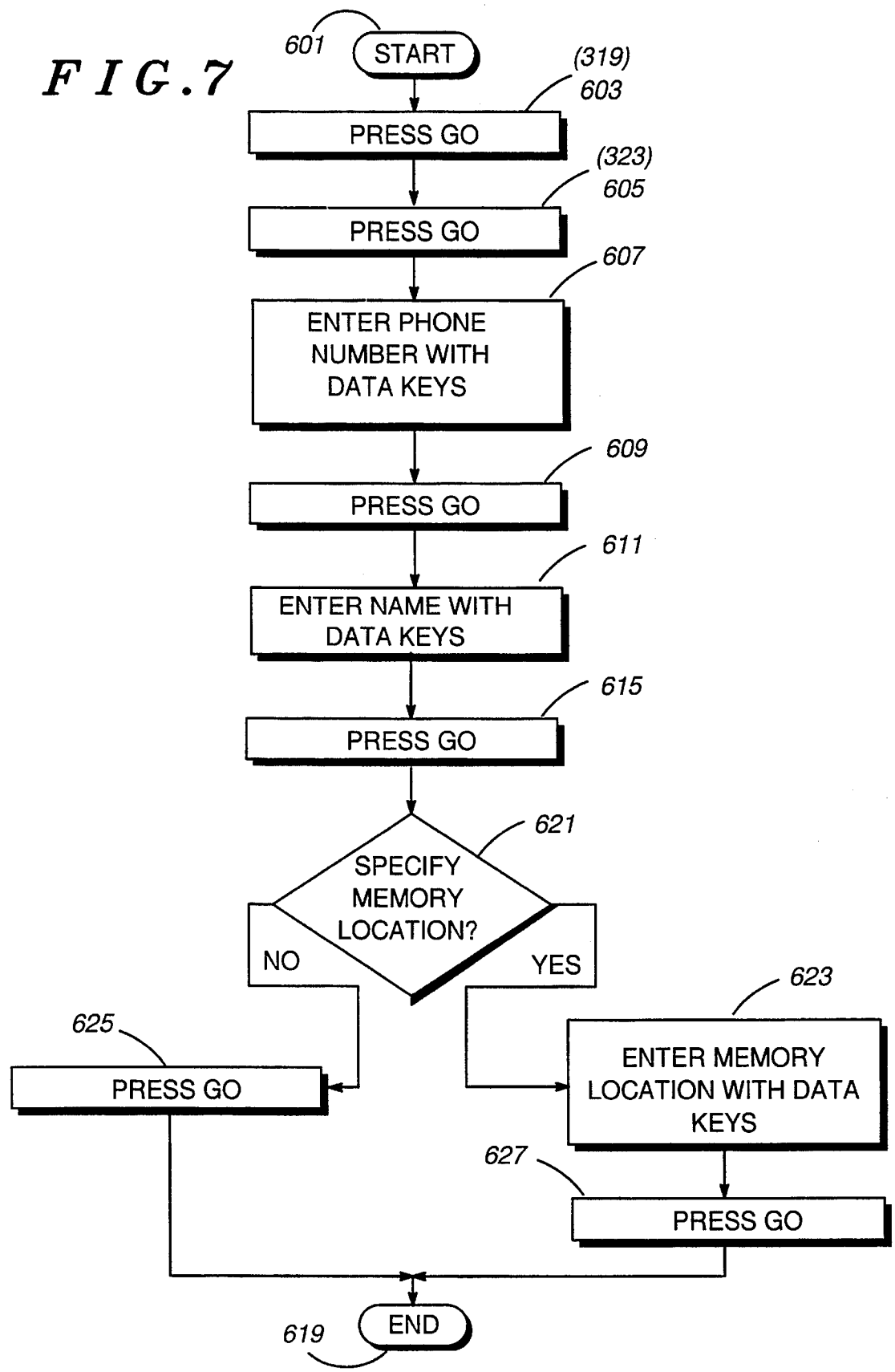
FIG. 7 is a process flowchart of storing a name and a phone number in the memory of a radiotelephone in accordance with the present invention.
Figure 8:
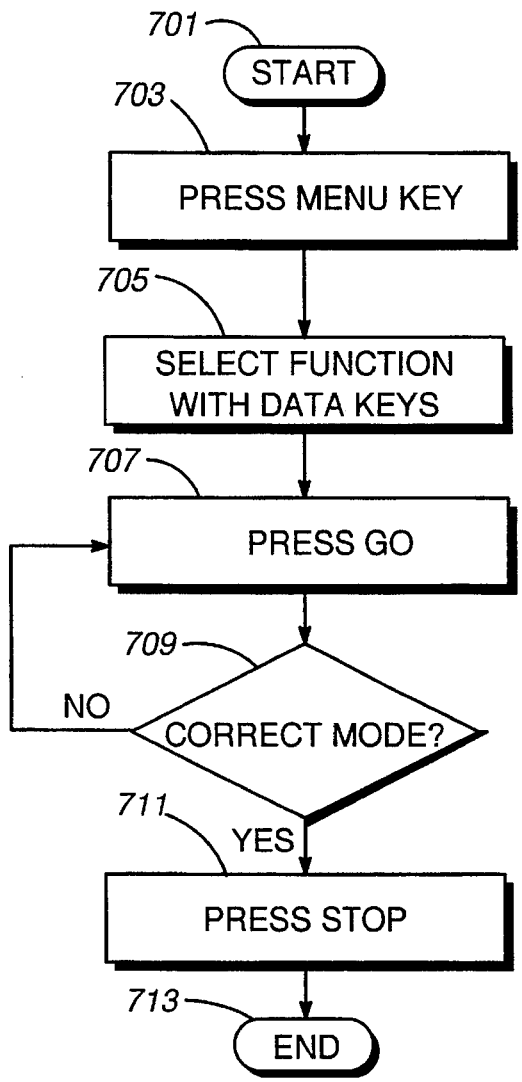
FIG. 8 is a process flowchart of selecting a mode of a menu function of a radiotelephone in accordance with the present invention.

FIG. 7 reveals the process which is used to enter phone numbers and corresponding names into the memory 907 of a radiotelephone 101 according to the present invention. The process starts at 601. At 603, the user presses the go key 121, entering the symbol mode state 307. At 605, the user presses the go key 121, enter the inputting name and number state 311. Here, the user selects the sequence of data keys representing a phone number. At 609, the user presses the go key 121 to store the number into the memory 907. At 611, the user enters the name which correlates to the above number with the data keys 119. Symbols can be entered with the standard keypad data keys 119 by depressing the designated data key a selected number of times. For example, when entering the word Bill into the display one would push the following data keys: 22 "#" 444 "#" 555 "#" 555. An alternate method of entering symbols is realized by pressing and holding the designated data key, the display 127 will scroll through the available symbols and when the key is released it holds the last displayed symbol. At any time during this data entry process the user may use the clear process as described in FIG. 5 to clear data key entries. At 615, after the symbol is entered correctly, the user presses the go key 121. At 621, the user decides whether to enter the specific memory location. If the user wants to enter the memory location, at 623 the memory location is entered with the data keys 119 and at 627 the go key 121 is pressed. If the user does not want to enter the memory location, then the go key 121 is pressed at 625 and the name and phone number are stored in the next available memory location. Optionally, the user may input the new names and phone numbers into the radiotelephone 101 by first selecting the "#" key and releasing it after two beeps have sounded. This would place the user at 607 in the preceding process.

FIG. 78 is a process flow chart of selecting modes of the menu functions. The functions include locking the phone, resetting the call timers, changing the unlock code or any of the functions that are available on a radiotelephone. The process starts by pressing a menu key at 703. The menu key can be activated by holding down the "*" key until two beeps sound or by pressing a menu function key 123, as shown in FIG. 2. At 705, the user enters the number representing the function with the data keys 119. Typically, there is a user's manual that accompanies all phones that states the numbers of each function. At 707, the go key 121 is pressed and the display shows the current mode of the function. If the mode is correct, at 711 the user presses the stop key 125. If the mode is not correct, at 707 the user presses the go key 121. The radio telephone will either toggle between two modes or step to the next mode if there are more than two possible modes. After the correct mode is selected at 709, the user presses the stop key at 711 and it stores the proper mode of the function into the memory 907 of the radiotelephone 101.

Figure 9:
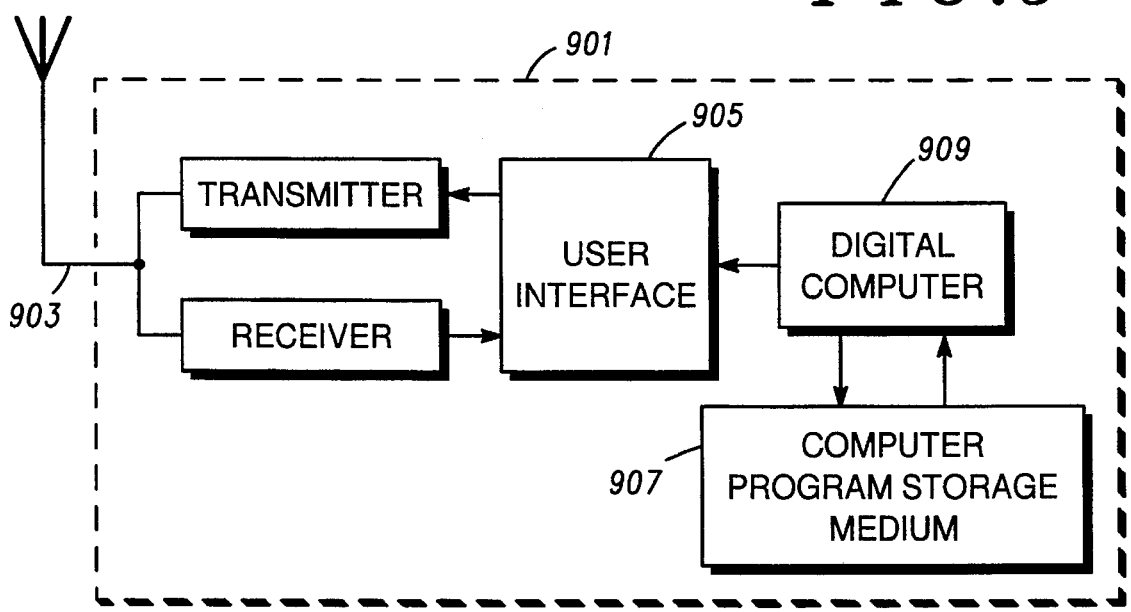
FIG. 9 is a block diagram of a radiotelephone which may employ the present invention.

FIG. 9 is a block diagram of a radiotelephone 901 which may employ the present invention. The radiotelephone 901 includes a computer program storage medium 907, commonly referred to as a memory device, a digital computer 909, and an user interface 905. The user interface 905 includes a microphone, a speaker, a display, data keys and function keys. The display, data keys and function keys are illustrated in FIG. 1 and FIG. 2. The computer program storage medium 907, the digital computer 909 and the user interface 905 used in conjunction with each other to form a radiotelephone operations controller. The radiotelephone operations controller controls the function of the radiotelephone 901.

Described herein is a method of controlling the functions of a radiotelephone with only two or three function keys. The radiotelephone 101 has many of the advanced functions of current radiotelephones without the complexity involved in utilizing the functions of the current radiotelephones. The functions as described are intuitive to the uneducated radiotelephone user.

What is claimed is:

1. A method of operating a radiotelephone, the radiotelephone including a memory, a display and a keypad with at least a first single-throw function key, a second single-throw function key, and a plurality of data keys, the method comprising the steps of:

creating a first function key signal solely responsive to the first single-throw function key to turn on the radiotelephone;

selecting a phone number using the plurality of data keys;

creating a second function key signal solely responsive to said first single-throw function key activating the radiotelephone to call said phone number;

creating a third function key signal solely responsive to the second single-throw function key disconnecting the radiotelephone from said call;

creating a fourth function key signal solely responsive to said second single-throw function key turning off the radiotelephone; and wherein said first single-throw function key does not revert back to creating said first function key signal unless said fourth function key signal has been created.

2. A method of operating a radiotelephone in accordance with claim 1 wherein said selecting said phone number further comprises step of selecting a first sequence of the data keys which represent a phone number.

3. A method of operating a radiotelephone in accordance with claim 1 wherein said selecting said phone number further comprises the step of selecting a second sequence of the data keys which represent a memory location within the memory of the radiotelephone.

4. A method of operating a radiotelephone in accordance with claim 1 wherein said selecting said phone number further comprises the steps of:

creating a fifth function key signal solely responsible to said first single-throw function key;

selecting a first designated data key representing a symbol; and displaying a symbol sequence from the memory whose first symbol is alphabetically closest to said symbol.

5. A method of operating a radiotelephone in accordance with claim 4 wherein said selecting said phone number further comprises the step of creating, responsive to said displaying said symbol sequence, a sixth function key signal solely responsive to a third single-throw function key, scrolling the memory in alphabetical order until said third single-throw function key is released.

6. A method of operating a radiotelephone in accordance with claim 4 wherein said selecting said phone number further comprises the step of creating, responsive to said displaying said symbol sequence, a seventh function key signal solely responsive to a third single-throw function key, advancing the display one symbol sequence in memory.

7. A method of operating a radiotelephone in accordance with claim 1 wherein said selecting said phone number further comprises the steps of:

creating an eighth and ninth function key signal solely responsive to said first single-throw function key;

selecting a third sequence of the data keys which represent a phone number;

creating a tenth function key signal solely responsive to said first single-throw function key;

selecting a fourth sequence of designated data keys in succession a predetermined number of times to designate an symbol sequence; and creating an eleventh function key signal solely responsive to said first single-throw function key.

8. A method of operating a radiotelephone in accordance with claim 1 wherein said selecting said phone number further comprises the steps of:

selecting a fifth sequence of data keys which represent a phone number or a memory location; and creating a twelfth function key signal solely responsive to said second single-throw function key for a first predetermined length of time, thereby clearing the last data key signal input.

9. A method of operating a radiotelephone in accordance with claim 1 wherein said selecting said phone number further comprises the steps of:

selecting a sixth sequence of data keys which represent a phone number or a memory location; and creating a thirteenth and fourteenth function key signal solely responsive to said second single-throw function key, thereby clearing said sequence of data input.

10. A method of operating a radiotelephone in accordance with claim 1 wherein said selecting said phone number further comprises the steps of:

selecting a seventh sequence of data keys which represent a phone number or a memory location; and creating a fifteenth function key signal solely responsive to said second single-throw function key for a second predetermined amount of time, thereby clearing said sequence of data input.

11. A method of operating a radiotelephone in accordance with claim 1 further comprising programming the radiotelephone with a phone number and a name, the programming comprising the steps of:

creating, responsive to said creating said first function key signal, a sixteenth and a seventeenth function key signal solely responsive to said first single-throw function key;

selecting an eighth sequence of the data keys representing the phone number;

creating an eighteenth function key signal solely responsive to said first single-throw function key;

selecting a ninth sequence of designated data keys in succession a predetermined number of times to designate the name; and creating a nineteenth function key signal solely responsive to said first single-throw function key.

12. A method of operating a radiotelephone in accordance with claim 1 further comprising the steps of:

creating, responsive to said creating said first function key signal, a twentieth function key signal solely responsive to a third single-throw function key for a third predetermined length of time;

selecting a tenth sequence of the data keys representing a first function of the radiotelephone;

creating a twenty-first function key signal solely responsive to said first single-throw function key designating a first mode of said function;

creating a twenty-second function key signal solely responsive to said first single-throw function key designating a second mode of said function; and creating a twenty-fourth function key signal solely responsive to said second single-throw function key, setting said feature in said second mode.

13. In a radiotelephone having a radiotelephone operations controller for use with a digital computer disposed within a radiotelephone, the radiotelephone operations controller comprising:

a first single-throw function key;

a second single-throw function key; and a computer program storage medium having a computer program stored thereon to be executed by the digital computer, the computer program operative to:

switching the radiotelephone on in response to a first function key signal solely responsive to said first single-throw function key;

initiating a phone call in response to a second function key signal solely responsive to said first single-throw function key;

storing a name and a phone number in a memory location in response to a third function key signal solely responsive to said first single-throw function key;

terminating a phone call in response to a fourth function key signal solely responsive to said second single-throw function key;

clearing a data entry in response to a fifth function key signal solely responsive to said second function key;

switching the radiotelephone off in response to a sixth function key signal solely responsive to said second single-throw function key; and wherein the first single-throw function key does not revert back to switching the radiotelephone on unless the radiotelephone has been switched off in response to the sixth function key signal.

14. A method of operating a radiotelephone comprising the steps of:

a) depressing solely a first uni-directional function key, turning on the radiotelephone;

b) selecting a phone number using a plurality of data keys;

c) depressing solely the first uni-directional functional key, activating a phone call to the selected phone number;

d) depressing solely a second uni-directional function key, deactivating the phone call;

e) depressing solely a second uni-directional function key, turning off the radiotelephone; and wherein the first uni-directional function key does not revert back to turning on the radiotelephone unless the radiotelephone has been turned off in response to depressing solely the second uni-directional function key.

15. A method of operating a radiotelephone in accordance with claim 14 wherein said selecting said phone number further comprises the step of selecting a first sequence of the data keys which represent a phone number.

16. A method of operating a radiotelephone in accordance with claim 14 wherein said selecting said phone number further comprises the step of selecting a second sequence of the data keys which represent a memory location within the memory device of the radiotelephone.

17. A method of operating a radiotelephone in accordance with claim 14 wherein said step of selecting said phone number further comprises the steps of:

depressing solely the first uni-directional function key;

selecting a first designated data key representing a symbol; and displaying a symbol sequence from the memory whose first symbol is alphabetically closest to said symbol.

18. A method of operating a radiotelephone in accordance with claim 17 wherein said selecting said phone number further comprises the step of solely depressing, responsive to said displaying said symbol sequence, a third uni-directional function key, scrolling the memory in alphabetical order until said third uni-directional function key is released.

19. A method of operating a radiotelephone in accordance with claim 17 wherein said selecting said phone number further comprises the step of solely depressing and releasing, responsive to said displaying said symbol sequence, a third uni-directional function key, advancing the display one symbol sequence in memory.

20. A method of operating a radiotelephone in accordance with claim 14 wherein said selecting said phone number further comprises the steps of:

solely depressing and releasing the first uni-directional function key twice;

selecting a third sequence of the data keys which represent a phone number;

solely depressing and releasing the first uni-directional function key;

selecting a fourth sequence of designated data keys in succession a predetermined number of times to designate a symbol sequence; and solely depressing the first uni-directional function key.

21. A method of operating a radiotelephone in accordance with claim 14 wherein said selecting said phone number further comprises the steps of:

selecting a fifth sequence of data keys which represent a phone number or a memory location; and depressing solely the second uni-directional function key for a first predetermined length of time, thereby clearing the last data key signal input.

22. A method of operating a radiotelephone in accordance with claim 14 wherein said selecting said phone number further comprises the steps of:

selecting a sixth sequence of data keys which represent a phone number or a memory location; and depressing solely and releasing the second uni-directional function key twice, thereby clearing said sequence of data input.

23. A method of operating a radiotelephone in accordance with claim 14 wherein said selecting said phone number further comprises the steps of:

selecting a seventh sequence of data keys which represent a phone number or a memory location; and depressing solely the second uni-directional function key for a second predetermined amount of time, thereby clearing said sequence of data input.

24. A method of operating a radiotelephone in accordance with claim 14 further comprising programming the radiotelephone with a phone number and a name, the programming comprising the steps of:

depressing solely, responsive to step a), the first uni-directional function key twice;

selecting an eighth sequence of the data keys representing the phone number;

depressing solely the first uni-directional function key;

selecting a ninth sequence of designated data keys in succession a predetermined number of times to designate the name; and depressing solely the first uni-directional function key.

25. A method of operating a radiotelephone in accordance with claim 14 further comprising the steps of:

depressing solely, responsive to step a), a third uni-directional function key for a third predetermined length of time;

selecting a tenth sequence of the data keys representing a first function of the radiotelephone;

depressing solely the first uni-directional function key designating a first mode of said function;

depressing solely the first uni-directional function key designating a second mode of said function; and depressing solely the second uni-directional function key, setting said feature in said second mode.

26. In a radiotelephone having a radiotelephone operations controller for use with a digital computer disposed within a radiotelephone, the radiotelephone operations controller comprising:

a first single-throw function key;

a second single-throw function key;

a computer program storage medium having a computer program stored thereon to be executed by the digital computer, the computer program operative to:

switching the radiotelephone on solely responsive to depressing the first single-throw function key a first time;

initiating a phone call solely responsive to depressing the first single-throw function key a second time;

storing a name and a phone number in a memory location solely responsive to depressing the first single-throw function key a third time;

terminating a phone call solely responsive to depressing the second single-throw function key a first time;

switching the radiotelephone off solely responsive to depressing the second single-throw function key a second time; and wherein the first single-throw function key does not revert back to switching the radiotelephone on unless the radiotelephone has been switched off by the second single-throw function key.

\* \* \* \* \*

UNITED STATES PATENT AND TRADEMARK OFFICE
CERTIFICATE OF CORRECTION

PATENT NO. : 5,594,778
DATED : January 14, 1997
INVENTOR(S) : Schaupp, Jr. et al.

It is certified that error appears in the above-identified patent and that said Letters Patent is hereby corrected as shown below:

Title Page

Item [57], Abstract

In line 8, please delete the phrase "from said first function key,".

Claim 2

In column 5, line 42, after the phrase "further comprises", please insert --the--.

Claim 4

In column 5, line 53, please replace "responsible" with --responsive--.

Signed and Sealed this

Thirtieth Day of December, 1997

Attest:

BRUCE LEHMAN

Attesting Officer

Commissioner of Patents and Trademarks